(12) United States Patent
Khafizov et al.

(10) Patent No.: US 8,892,594 B1
(45) Date of Patent: Nov. 18, 2014

(54) SYSTEM AND METHOD FOR SEARCH WITH THE AID OF IMAGES ASSOCIATED WITH PRODUCT CATEGORIES

(75) Inventors: Farid Khafizov, Plano, TX (US); Margarita Khafizova, Plano, TX (US)

(73) Assignee: Open Invention Network, LLC, Durham, NC (US)

( * ) Notice: Subject to any disclaimer, the term of this patent is extended or adjusted under 35 U.S.C. 154(b) by 590 days.

(21) Appl. No.: 13/168,540

(22) Filed: Jun. 24, 2011

Related U.S. Application Data

(60) Provisional application No. 61/359,057, filed on Jun. 28, 2010.

(51) Int. Cl.
  *G06F 17/30* (2006.01)
(52) U.S. Cl.
  CPC .............................. *G06F 17/30864* (2013.01)
  USPC .......................................... 707/769; 707/704
(58) Field of Classification Search
  CPC ................................................ G06F 17/30864
  USPC ................................................ 707/704, 769
  See application file for complete search history.

(56) References Cited

U.S. PATENT DOCUMENTS

| | | | | |
|---|---|---|---|---|
| 7,565,139 B2 * | 7/2009 | Neven et al. | ............... | 455/414.3 |
| 7,603,367 B1 * | 10/2009 | Kanter et al. | ............... | 707/769 |
| 7,664,739 B2 * | 2/2010 | Farago et al. | ............... | 707/722 |
| 7,765,227 B1 * | 7/2010 | Khoshnevisan et al. | ............... | 707/769 |
| 8,171,030 B2 * | 5/2012 | Pereira et al. | ............... | 707/741 |
| 8,392,430 B2 * | 3/2013 | Hua et al. | ............... | 707/748 |
| 8,494,310 B2 * | 7/2013 | Aono et al. | ............... | 382/305 |
| 2002/0038299 A1 * | 3/2002 | Zernik et al. | ............... | 707/769 |
| 2004/0083203 A1 * | 4/2004 | Kemp | ............... | 707/769 |
| 2008/0313140 A1 * | 12/2008 | Pereira et al. | ............... | 707/704 |
| 2010/0054607 A1 * | 3/2010 | Aono et al. | ............... | 382/203 |
| 2011/0072048 A1 * | 3/2011 | Hua et al. | ............... | 707/780 |

OTHER PUBLICATIONS

Weboptimser, "Researchers develop image-based search engine", Apr. 14, 2004.
Tada, Masahiro, et al., "Similarity Image Retrieval System Using Hierarchical Classification", Springer-Verlag, Berlin, Heidelberg, 2002.
PR Newswire, "Ereo Introduces Industry's First Image-based Search Engine that Allows Search by Pictures and Other Rich Media", PR Newswire, Nov. 13, 2000.
netdaily.org, "VizSeek the Image Based Search Engine", NetDaily.org, 2008.

\* cited by examiner

*Primary Examiner* — Shahid Alam
(74) *Attorney, Agent, or Firm* — Haynes and Boone, LLP

(57) ABSTRACT

The present application describes performing a user initiated search query comprising receiving user input comprising description details of at least one desired object, retrieving a plurality of objects from a database sharing one or more of the description details of the user input, retrieving an image of the at least one desired object based on one or more of the plurality of objects, generating a contour of the image and comparing the generated contour with other related contours of other images stored in the database, displaying all of the available contours of all of the images that match the generated contour, receiving a selection of one of the available contours from the user and performing the search query based on the user selected contour.

20 Claims, 13 Drawing Sheets

"A SNAPSHOT FROM WWW.TARGET.COM ONLINE SEARCH RESULTS FOR "KNIFES""

SNAPSHOT FROM WWW.TARGET.COM ONLINE SEARCH RESULTS FOR "KITCHEN KNIFES"

SYSTEM AND METHOD FOR SEARCH WITH THE AID OF IMAGES ASSOCIATED WITH PRODUCT CATEGORIES

CROSS-REFERENCE TO RELATED APPLICATIONS

This application claims the benefit of U.S. Provisional Patent Application No. 61/359,057, filed on Jun. 28, 2010. The subject matter of the earlier filed application is hereby incorporated by reference in its entirety.

FIELD OF THE INVENTION

The present invention describes a system, method and computer readable storage medium comprising instructions for searching an object. The invented system's search process takes advantage of images associated with certain properties of the object (e.g., consumer product) the user is looking for. The invented system facilitate the search process by taking graphical depiction of one or more properties of the desired object and comparing it with the corresponding images common to groups of objects similar to the desired object. This invention is based on a simple method, included here by reference (see below), for building a category tree for the objects among which the desired object is being searched. The invention is applicable to search of any items, and is illustrated with an example of various applications from the consumer product searches. The disclosed embodiments relate generally to electronic devices with one or more physical nodes, and more particularly, to search systems and methods.

To illustrate motivation for the invention let us consider a search process of a consumer product in online store. For example, we want to find a certain knife in online store of one of the major retailer such as Target. If we do not have precise or sufficient description of the knife we are looking for, the online search engine will return hundreds of items matching word "knife" (see FIG. 1A) and leave us with no option but to scroll through description of all of these objects one by one through many pages. While this example is very specific it is not unique. Whatever information was entered by the user (e.g., us) into the search system, most likely we have not entered all the information we have about the knife we are looking for. This situation occurs frequently because we do not know how to describe what we know about the object, e.g., its shape, certain design style, combination of color, etc. Most of the time, even if we could, the system does not provide means for us to enter all that information, simply because designing a universal user interface is impossible. Thus there is a need for a system and method that utilizes somehow the additional information that has not been provided to the system. This application incorporates by reference the entire contents of the "Attribute Category Enhanced Search" application, which provides search process enhancement through constructing a tree with the nodes representing groups of objects with similar values for some categories. The present invention further improves the search process by allowing the user to enter graphical depiction (image) of the desired object. Then the invented system will automatically match user entered image to one (or more) images of the categories of objects in the search domain. If a good match is found the search process will continue along the corresponding path.

BACKGROUND

Searching is a popular topic in the computing world. With users wanting and demanding faster application, increase in information processing speeds, more memory, and smarter computers, searching and a system's ability to return accurate results very quickly is viewed as an important aspect of the computer experience. Some of the recent patents try to address this problem. For example, in the U.S. Pat. No. 7,664,739 "Object search ui and dragging object results" an object navigation system, user interface, and method that facilitate faster and smoother navigation of objects are provided. The invented, the system can generate a plurality of objects that can be rendered on a display space that spans a single page in length, thereby mitigating the need to navigate through multiple pages. The objects can also be viewed in a film strip format that is infinitely scrollable. While such techniques undoubtedly make search process more convenient compared to page-by-page navigation through search results, they fail to address the crucial requirement of fast search speed. Another shortcoming of the above mentioned patent is the lack of ability of the invented system to automatically reduced search space based on digital representation of information provided by the user about the object the user wants to find.

Digital image based search was also addressed in the industry. For example, in the U.S. Pat. No. 7,565,139 "Image based search engine for mobile phone with cameras", the inventors improve user's search experience by allowing him to take a digital photograph of an object, match it with an item in the remote database and provide full information about the object to the user. Key ideas facilitating the search process include doing the initial search on the mobile phone, so that database access overhead is minimized, and sending low resolution image to the server, so that less bandwidth is needed thus improving the response time of the application. Unfortunately this and other search related intentioned we examined do not provide an effective solution in case when exact image or description of the desired object is not available. Conventional search systems display or present search results in the form of a column or list to the user (e.g., see FIG. 1A). This format can be problematic from the user experience point of view for several reasons. The list may span many (sometimes hundreds) pages. Therefore the process of examining search results quickly becomes cumbersome and time-consuming. The user examining search results page by page gets tired and may skip important information. Thus only the item located on the top of the list will get full attention of the user.

Example of a typical example of search results for a consumer product on the internet is shown in FIG. 1A. For illustration purposes we use online product search tool of one of the major retail stores TARGET. Search for a word "knife" on www.target.com returns a list of 585 items. The search can be refined by specifing more precisely the desired object, e.g. by entering "kitchen knife", etc. The result however is still a rather long list of "matching objects". As is seen in FIG. 1B, the user would have to examine up to 277 "kitchen knifes". This situation is not uncommon for other other widely available products such consumer electronics, a piece of furniture, bicycle, more recently even solar screen, etc. Therefore, a more efficient system and method is needed that can guide the consumer through the search process, that matches his visual expectation and leads quickly to the right object.

Thus, in this invention we address the problem of improving the effectiveness of finding a roughly described object in a large set of similar object. We illustrate the invention using example of search for a knife. It will obvious from the description presented later in this disclosure, the system and method are applicable for search of any object.

SUMMARY

The following presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

Main idea of the invention is based on enhancing search process by splitting all available objects (after some pre-selection) into categories and walking the user through the tree constructed from these categories and automatically matching one or more depictions of the object (or parts of it) with shapes/images corresponding to groups of objects in the search domain.

The subject application relates to a system(s) and/or methodology that facilitate viewing and refining search results. In particular, the application involves an improved data representation, improved search method and enhanced navigation method that when taken together, provide a smoother and more efficient search experience for a user. Contrary to traditional user interface and navigation means, the results are not paginated across multiple pages. Rather, they are essentially maintained on a single page, whereby the length of the page can depend in part on the number of objects attributes grouped in categories (defined later). Thus, they can be scrolled through all at once mitigating the need to page over and over again to see more results.

Solution presented in this invention disclosure consists of a system that takes initial input describing the desired object (e.g., consumer product) form the user. Then the system retrieves all the objects (e.g., products) matching the entered search criteria, constructs a tree structure based on objects' detailed description, and guides the user through that tree so that the user finds the desired product in a much fewer steps than going through the original long list. Construction of the tree structure and walking through the tree is facilitated by the auxiliary images matching categories related to the objects, whenever it is possible. By visually matching each category with the associated picture, the user can quickly determine the right category of objects, thus narrowing the search space and finding the desired object quickly.

To the accomplishment of the foregoing and related ends, certain illustrative aspects of the invention are described herein in connection with the following description and the annexed drawings. These aspects are indicative, however, of but a few of the various ways in which the principles of the invention may be employed and the subject invention is intended to include all such aspects and their equivalents. Other advantages and novel features of the invention may become apparent from the following detailed description of the invention when considered in conjunction with the drawings.

Figure 1A:
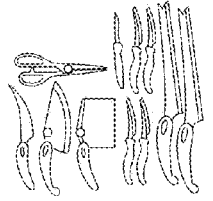
FIG. 1A is a snapshot from www.target.com online search results for "knifes"
Figure 1A:
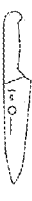

The foregoing summary, as well as the following detailed description of certain embodiments of the present invention, will be better understood when read in conjunction with the appended drawings. The figures illustrate diagrams of the functional blocks of various embodiments. The functional blocks are not necessarily indicative of the division between hardware circuitry. Thus, for example, one or more of the functional blocks (e.g., processors or memories) may be implemented in a single piece of hardware (e.g., a general purpose signal processor or a block or random access memory, hard disk, or the like). Similarly, the programs may be stand alone programs, may be incorporated as subroutines in an operating system, may be functions in an installed imaging software package, and the like. It should be understood that the various embodiments are not limited to the arrangements and instrumentality shown in the drawings.

DETAILED DESCRIPTION OF THE INVENTION

Figure 2:
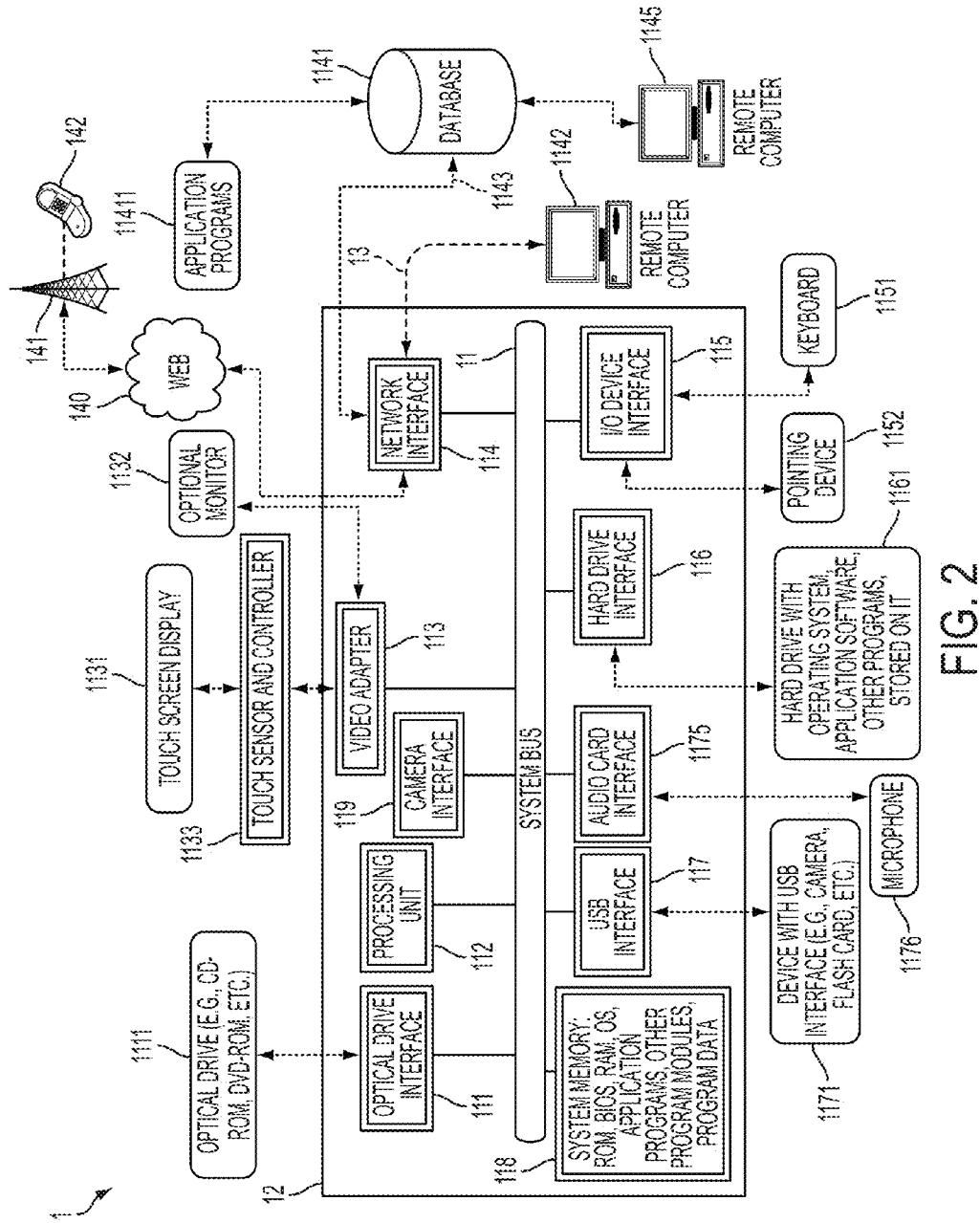
FIG. 2 illustrates a functional block diagram of a generally conventional computing device or personal computer that is suitable for analysis of data records in connection with the interactive display table, in accordance with the present invention.

Aspects of the present invention can be used in connection with a computing device including a touch screen. With reference to FIG. 2, an exemplary system 1 suitable for implementing various portions of the present invention is shown. The system includes a general purpose computing device in the form of a conventional computer (PC) 12, provided with a processing unit 112, a system memory 118, and a system bus 11. The system bus couples various system components including the system memory to processing unit 112 and may be any of several types of bus structures, including a memory bus or memory controller, a peripheral bus, and a local bus using any of a variety of bus architectures. The system memory includes read only memory (ROM) and random access memory (RAM). A basic input/output system (BIOS), containing the basic routines that help to transfer information between elements within the PC 12, such as during start up, is stored in ROM. The PC 12 further includes a hard disk drive 1161 for reading from and writing to a hard disk (not shown), an optical disk drive 1111 for reading from or writing to a removable optical disk, such as a compact disk-read only memory (CD-ROM) or other optical media. Hard disk drive 1161 and optical disk drive 1111 are connected to system bus 11 by a hard disk drive interface 116 and an optical disk drive interface 111, respectively. The drives and their associated computer readable media provide nonvolatile storage of computer readable machine instructions, data structures, program modules, and other data for PC 12. Although the exemplary environment described herein employs a hard disk and removable optical disk, it will be appreciated by those skilled in the art that other types of computer readable media, which can store data and machine instructions that are accessible by a computer, such as magnetic disks, magnetic cassettes, flash memory cards, digital video disks (DVDs), Bernoulli cartridges, RAMs, ROMs, and the like, may also be used in the exemplary operating environment.

A number of program modules may be stored on the hard disk, optical disk, ROM, or RAM, including an operating system, one or more application programs, other program modules, and program data. A user may enter commands and information via the PC 12 and provide control input through input devices, such as a keyboard 1151 or a pointing device 1152. Pointing device 1152 may include a mouse, stylus, wireless remote control, or other pointer, but in connection with the present invention, such conventional pointing devices may be omitted, since the user can employ the touch sensitive interactive display for input and control. As used hereinafter, the term "mouse" is intended to encompass virtually any pointing device that is useful for controlling the position of a cursor on the screen. Other input devices (not shown) may include a microphone, joystick, haptic joystick, yoke, foot pedals, game pad, satellite dish, scanner, or the like. These and other input/output (I/O) devices are often connected to processing unit 112 through an I/O interface 115 that is coupled to the system bus 11. The term I/O interface is intended to encompass each interface specifically used for a serial port, a parallel port, a game port, a keyboard port, and/or a universal serial bus (USB).

System bus 11 is also connected to a camera interface 119. The digital video camera may be instead coupled to an appropriate serial I/O port, such as to a USB port. A monitor 1132 can be connected to system bus 11 via an appropriate interface, such as a video adapter 113. The system also has a touch screen display 1131 which can provide richer experience for the user and interact with the user for input of information and control of software applications. The touch screen display 1131 is communicatively coupled to a touch sensor and controller 1133. Touch sensor and controller can be combined in one block 1131 or they can be separate communicatively coupled blocks. It should be noted that the touch screen display 1131 and the touch screen sensor and controller 1133 can be enclosed into a single device as well. User interface can be implemented through the optional monitor 1132 coupled with the touch sensor and controller 1133 though the video adapter 113 or directly via internet, wireless, or another connection. It will be appreciated that PCs are often coupled to other peripheral output devices (not shown), such as speakers (through a sound card or other audio interface—not shown) and printers.

A cell phone 142 is connected to PC 12 thought the wireless base station 141 and the network interface card 114. The wireless base station 141 can be connected to the network interface card 114 either directly or through the internet 140. Therefore PC 12 can communicate with the cell phone 142. Combination of various protocols such as, IP, Wi-Fi, GSM, CDMA, WiMax, UMTS and the like, can be used to support communication between the PC 12 and the cell phone 142.

The present invention may be practiced on a single machine, although PC 12 can also operate in a networked environment using logical connections to one or more remote computers, such as a remote computer 1142. Remote computer 1142 may be another PC, a server (which can be configured much like PC 12), a router, a network PC, a peer device, or a satellite or other common network node, and typically includes many or all of the elements described above in connection with PC 12. The logical connection 13 depicted in FIG. 1B can be a local area network (LAN) or a wide area network (WAN). Such networking environments are common in offices, enterprise wide computer networks, intranets, and the Internet.

When used in a LAN networking environment, PC 12 is connected to a LAN through a network interface or adapter 114. When used in a WAN networking environment, PC 12 typically includes a modem (not shown), or other means such as a cable modem, Digital Subscriber Line (DSL) interface, or an Integrated Service Digital Network (ISDN) interface for establishing communications over WAN, such as the Internet. The modem, which may be internal or external, is connected to the system bus 11 or coupled to the bus via I/O device interface 115, i.e., through a serial port. In a networked environment, program modules, or portions thereof, used by PC 12 may be stored in the remote memory storage device. It will be appreciated that the network connections shown are exemplary and other means of establishing a communications link between the computers may be used, such as wireless communication and wide band network links.

Figure 1B:
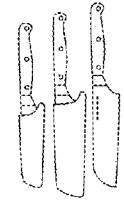
FIG. 1B is a snapshot from www.target.com online search results for "kitchen knifes"

Conventional search systems display or present search results in the form of a column or list to the user. Example of such output of search results is shown in FIG. 1B. The list may span many pages. Hence the process of examining search results becomes cumbersome and time-consuming. The user examining search results page by page gets tired and may skip important information. Thus only the item located on the top of the list will get full attention of the user. Clearly, this is not the best user experience, for someone who wants to find the desired product quickly.

Figure 3A:
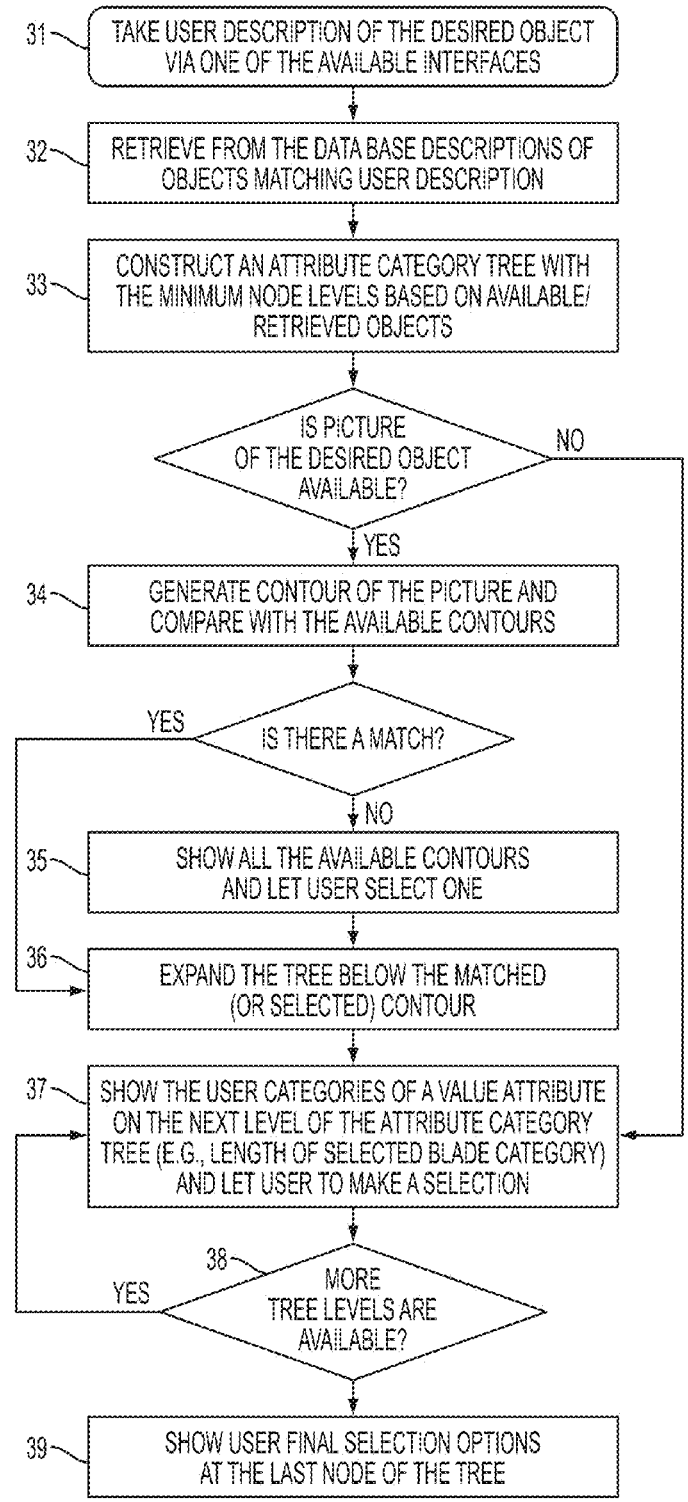
FIG. 3A is an example of a flow chart illustrating the main steps of the invented method.

This invention provides a smarter search solution, which takes however minimum information the user may has about the object he is trying to find, and guides him quickly to the searched object. The main steps of the invented method are illustrated in FIG. 3A below. Each of the steps shown in FIG. 3A is described in detail in the following paragraphs.

Step 31: The system 1 takes the initial input describing the desired object (e.g., a consumer product such as knife) form the user via one or several user interfaces shown in FIG. 2. Methods of entering information about the desired object include but are not limited to text or audio description, digital image input as a file or as a reference to picture on the internet. For example, regular description of the object can be entered as text using the keyboard 1151 and displayed in monitors 1132 or 1131. The user would access the GUI and enter, for example, "The knife is serrated and is made in France with an animal imprint on the blade". The user may provide object description in the form of a picture taken by a digital camera or mobile phone and uploaded to the Processing unit 112 of the system through the camera interface 119 or USB interface 1171. The entered digital photo does not have to be a picture of the exactly the same object. As will be seen later a picture of an object resembling the desired object may suffice. An image resembling the desired object can also be submitted as a digital file (in JPG, GIF or another format) stored on a CD or DVD an accessible by the system's software via optical drive 1111. Using a touch screen interface 1131 the user can enter hand-drawn sketch of the desired object or part of it, e.g. distinct shape of knife blade. The system can also accept a universal record locator (URL) of an image resembling the desired object available on the remote computer (such as PC 1142) via HTTP (web page, or ftp site, etc, and downloadable to the system via internet. Audio description of the desired product can also be entered through the microphone 1176 connected to the audio-card 1175 and processed by speech recognition system.

Figure 3B:
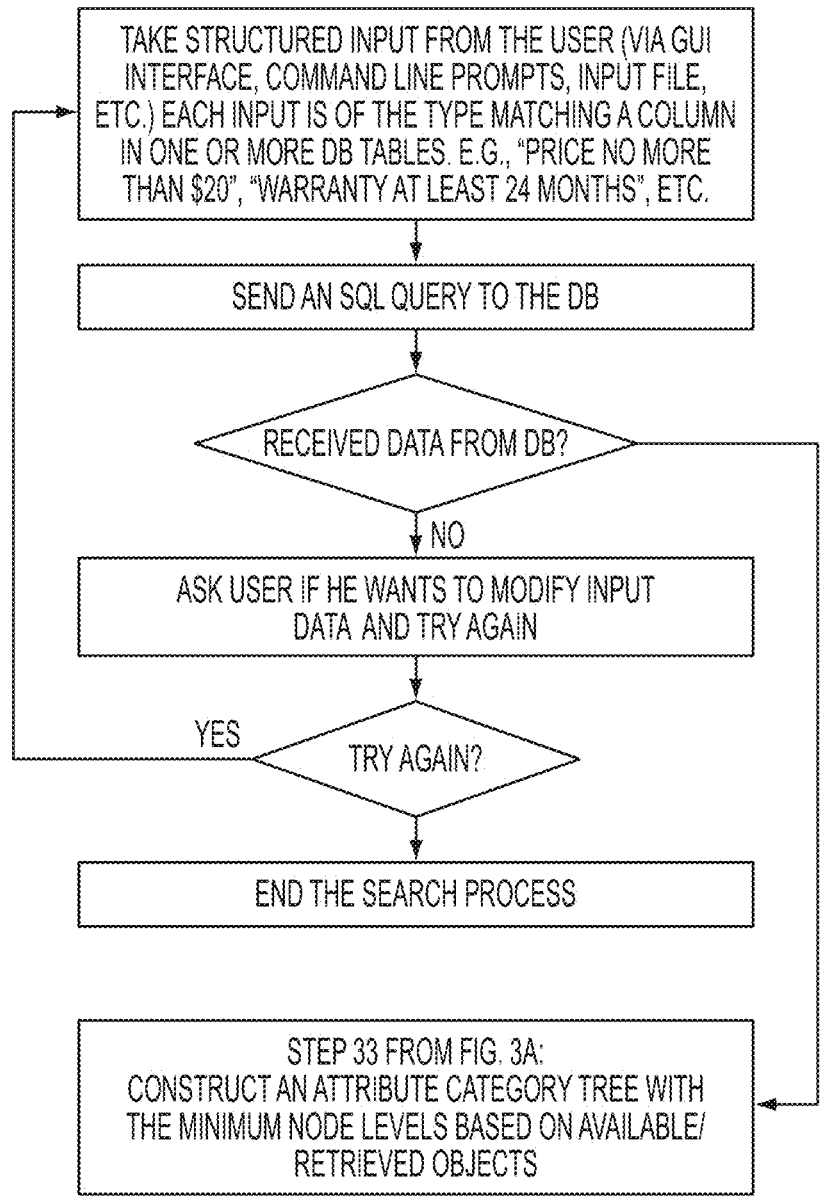
FIG. 3B is an example of a flow chart illustrating STEP 32 from FIG. 3A (retrieval of information from the database), in accordance with the present invention.

Step 32: Some information entered by the user (e.g., price range, warranty period, manufacturer, etc.) will be of the same type as columns in one or more the database tables, and could, therefore, be usable for constructing an SQL query. We will refer to such information as structured. However some information may not be easily translated into a structured query, but yet can be used by the user to guide to navigate through the search process and find the desired product quickly. This will be illustrated in Step 34 below. Based on the structured input, software running on processor 112 of the system 1 will form a query to the database 1141 and retrieves information about all the objects (products) matching the entered search criteria. Original data can be stored in the database 1141 in various formats as explained in more detail in Appendix B of above referenced disclosure "Attribute Category Enhanced Search". A flow chart illustrating this procedure is shown in FIG. 3B. If no information matching the query built based on the entered the criterion is returned, the system will prompt try to widen the interpretation of the entered data and looks for objects matching the new interpretation of data. If user enters via GUI object description "The knife is serrated and is made in France with an animal imprint on the blade" as shown in the example above, the system will first try to interpret the text as a combination of structured elements of information. A query will be formed with elements such as "Product=Knife", "MadeIn=France", "Serrted=Yes", etc. If not matching is found in the database, the system will view the input text as unstructured information and do search on the internet for images associated with user provided input. If that approach fails, the system will try to match it with any information previously entered by other users and earlier obtained results, etc.

In order for the system to become "smart", it will have to learn from all previous search attempts. The system will analyze the results of each search, provide the analyzed results to the user and if the user selects one or more of the results, the system will store that information in case another user at some other time has a similar request, etc. In the unlikely event of no information matching the query is returned, the system will prompt the user to change the entries in the input or reduced the entered information. Connection of the database 1141 can be implemented via communication link 1143, which includes but is not limited to a wire-line connection (such as Ethernet), a wireless connection (Bluetooth, WiFi, etc.), or any other connection supporting information exchange between computing devices, and via the corresponding network interface 114. Let's assume that based on the structured information the system is able to retrieve n objects described by m attributes.

In alternative embodiment of the invention, step 32 is omitted. In that case all information entered by the user is sent to the remote computer 1145 co-located with the database 1141. Therefore without loss of generality in the continued description of the invention we can assume that all the information is non-structured. The idea behind the usage of non-structured information is to present the user with limited choices at each step according to his understanding of the right choice in each step. Whenever possible this process is automated by matching graphical input depicting the desired product and/or set attribute values of the product.

Step 33: In this step the system constructs a tree based on attributes of available objects with the minimum level of nodes need to complete the search process in pre-defined number of interactive search steps (described below) s. Alternatively the system may construct a tree that will keep the number of choices available to the user at each step at pre-defined value k, The relationship between k and s is very simple: $s = \log_k n$. The tree is constructed based on the values of objects' attributes. Each node of the tree represents a group of objects with certain attribute values being similar. Non-similar groups related to the same attribute form nodes of the tree in the same level. Once the tree is constructed, the search can be made very fast. Specifically if there are n objects, and k is the number of distinct groups for each attribute, the estimated number of step s for search completion is $\lceil \log_k n \rceil$. For example, if we allow 4 distinct attribute groups for each attribute, the maximum number s of search steps for a set of 277 objects (as in FIG. 1B) is 5.

Figure 4:
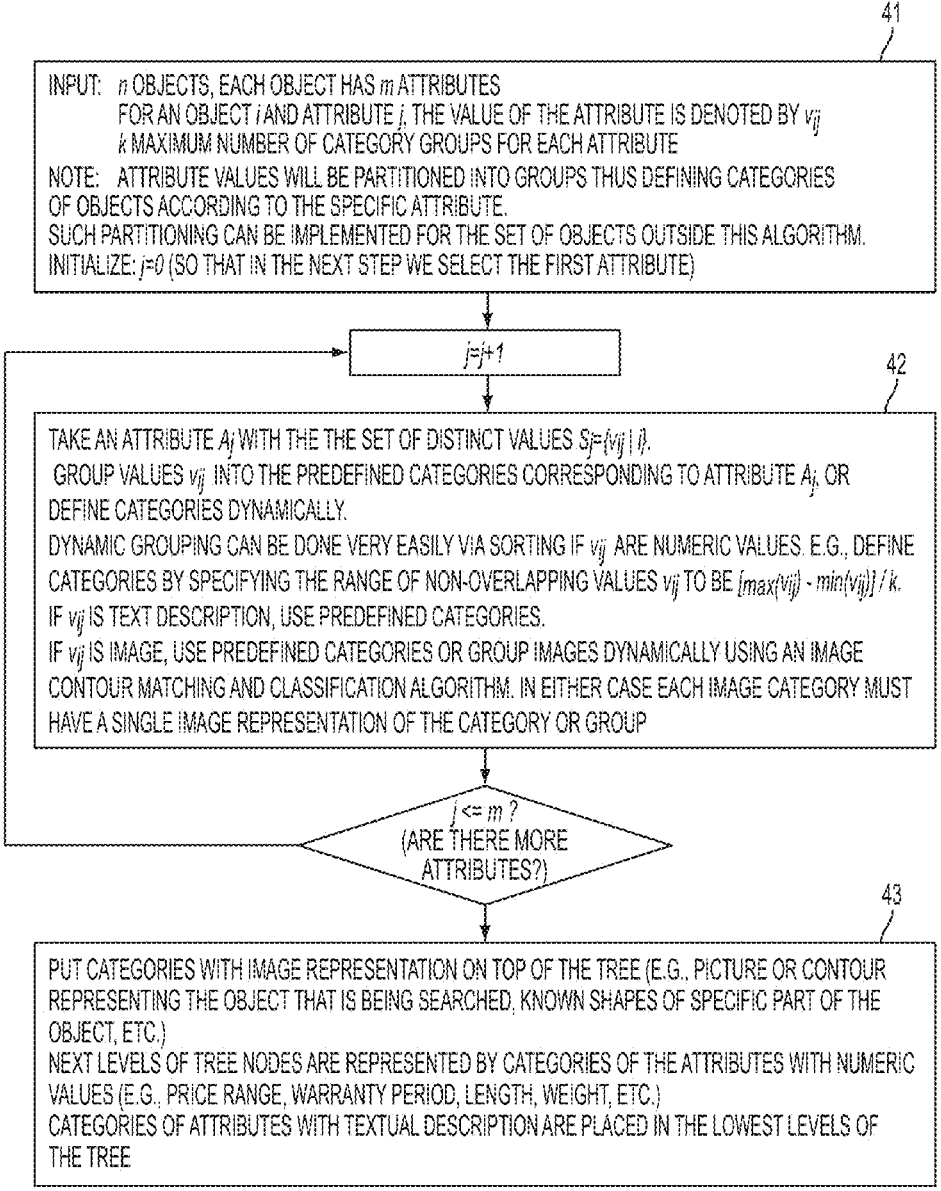
FIG. 4 is an example of a flow chart illustrating attribute category tree construction in accordance with an embodiment of the present invention.

The tree construction algorithm is illustrated by a flow chart in FIG. 4 in three main steps. Step 41 describes input to the tree construction algorithm. These are number n of objects, each object is described by m attributes as described earlier. We also assume that we are given maximum number k of categories for each attribute (see previous paragraph). Step 42 describes category construction for each type of attributes. Non-numeric attributes such product images are mapped to one of the image categories by default. Each such category has an image representing it. Such categories are put on top of the tree and will be used to guide a user through the selection process automatically if user provides product's picture, sketch etc. and successful matching was found. This process will be described in detail later.

For a numerical attribute j (e.g., price) we can identify range of the attribute values (in this case that would minimum and maximum price). The price range is split into k intervals each containing equal number of distinct price values. Then each price interval defines price category. It is obvious that user presented a choice of price category will be able to select the one which will guarantee that the number of choices does not exceed |S|/k, where |S| is the number of distinct price values. Step 42 is repeated for all m attributes. For example, later in the illustrate length of knife blade as another category set. Finally in step 43, tree nodes for which graphical depiction is available in the user input, are being placed on the top of the tree. E.g., picture or contour representing the object that is being searched, known shapes of specific part of the object, etc. If a match is found between graphical depiction of user's input and one of the corresponding attributes categories, the system will automatically reduce the search space. Next levels of tree nodes are represented by categories of attributes with numeric values (e.g., price range, warranty period, length, weight, etc.) Categories of attributes with textual description are placed in the lowest levels of the tree. These attribute values are not easy to categorize and almost always the corresponding categories will be predefined. For example consider such attribute of a product as "manufacturer". Most likely the user either will know exactly what value of such attribute he is looking for, in which case the selection is very simple, or he does not know, and at the end of the search process we will be left with a very few products to choose from, so that selection process can be completed quickly.

As stated earlier the purpose of the algorithm is to facilitate object search by the user, who has some (perhaps very limited) non-structured information about the object which has not been used yet. Each attribute A[j], 1≤j≤m, can take N[j] different values. We can assume that no two objects have the same attribute values. Therefore, n could be at most N[1]·N[2]· . . . ·N[m]. Examples of attributes for a product such as knife can be described A[1]="shape of the blade"; A[2]="length of blade"; A[3]="quality of the material (e.g. steel that the blade is made of)"; A[4]="handle color", A[5]="warranty period"; A[6]="price" etc. Some attributes, such as "price", "warranty period", etc., have numeric values, others can be represented by images, e.g., "shape of the blade". If the number of choices k at each step is predefined, for each attribute the set of distinct values is divided into k groups. For example, if k=4, then shapes of blades will be split into four categories.

Figures 6A, 6B, 6C, 6D:
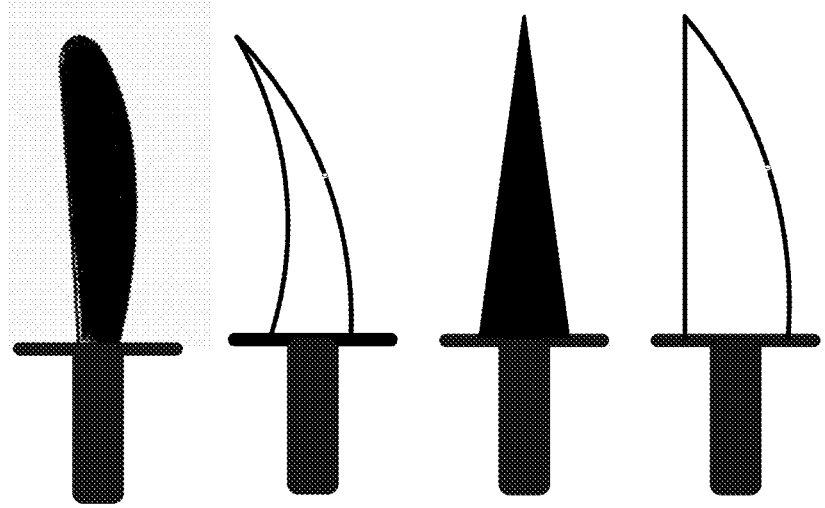
FIG. 6A-FIG. 6D examples of images representing shape categories.
Figure 6E:
FIG. 6E example of image of a product.

The method of splitting shapes in categories utilizes one or more of known image classification algorithms. One such algorithm is described in Appendix A below. The system uses image representation of each object whenever possible. Each object in the database has a photo, and therefore all available photos can be grouped in categories. Example of such grouping is shown in FIG. 6A-D. We will refer to these images as shapes images of the corresponding categories shape-A, shape-B, shape-C, and shape-D. Whenever graphical depiction of the desired object has been entered by the user according to step 31, the system will attempt to map that depiction to one of the category shapes (see Step-34). Mapping can be done using the "The shape matching algorithm" described in Appendix A, or using "Simple Shape Matching Procedure" described in detail below (please see paragraph 42), or by combining results of both approaches. It should understand that suggested image mapping options are used only for illustrative purposes. Many other image comparison algorithms exist. Usage of some of them or a combination of two or more is possible without deviating from present invention. For example shape of the knife shown in FIG. 6E is closest to the shape shown in FIG. 6D, and therefore that knife will be in the category shape-D. If mapping is successful, user interaction with the system is further minimized, and the search process is made faster.

Figure 3C:
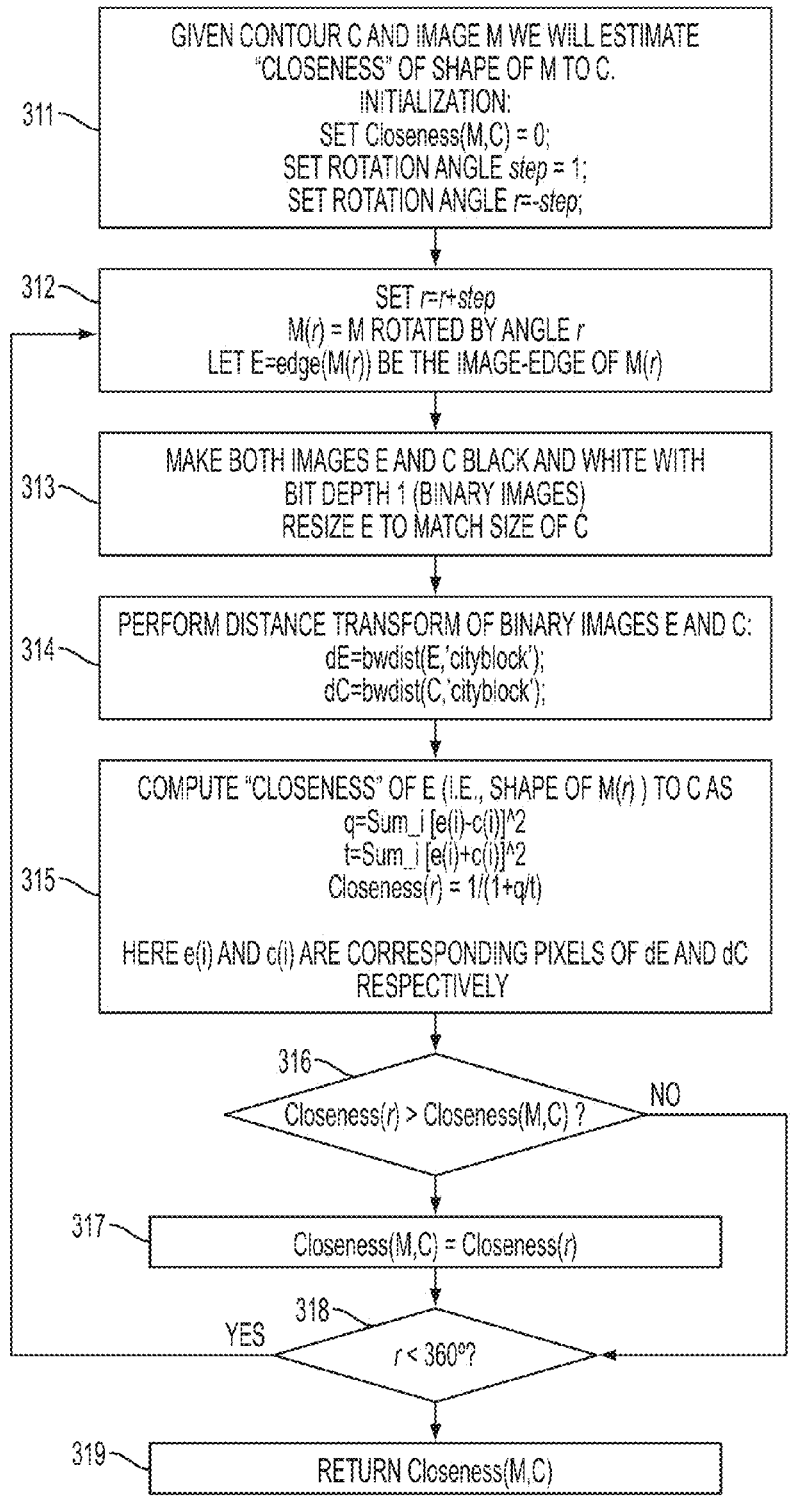
FIG. 3C is an example of a flow chart illustrating STEP 34 from FIG. 3A (matching contour of an image with another contour), in accordance with the present invention.

Step 34: If an image resembling a desired product is available, the system will extract a contour of the image and try to match it with the contours of objects available in the database. For example, the system may utilize a simple shape matching algorithm flow chart of which is shown in FIG. 3C and is described in the next two paragraphs. Another algorithm that can used for shape matching was proposed in paper "From images to shape models for object detection" by V. Ferrari et al. Example illustrating possible implementation based on this algorithm is described in Appendix A below.

Simple Shape Matching Procedure:

Given a contour C and an image M, we can estimate closeness of shape of M to C as follows. Please refer to FIG. 3C for illustrative flow chart of possible implementation of the shape matching algorithm. As a closeness measure we use a metric we call closeness(M,C) will be defined precisely in step 315 below. In step 311 we start the algorithm by initializing closeness(M,C)=0, which means there is no match between shape of M and contour C. We will rotate image M and try to match with C step by step, therefore we initialize rotation step to 1 degree, and set rotation angle r=−step. The next step 312 starts our iterative procedure by setting r=r+step and rotating M by angle r. Note that M(r) denotes M rotated by angle r. Rotation can be performed, for example, by multiplying each M pixel's coordinates by the rotation matrix [cos(r)−sin(r); cos(r) sin(r)]. Then we extract image E consisting of pixels forming edge of M. There are several methods that can be used for this procedure, e.g., edge(M(r)) function from Matlab. In step 313 we transform images E and C into binary images and resize E to match the size of C. These are also straightforward image processing procedures that are easily implementable, for example, using standard Matlab routines. In step 314 we perform the distance transform of binary images E and C and get images dE and dC. In particular, for each pixel in E (and C) we assign a number that is the distance between that pixel and the nearest nonzero pixel of E (and C). The distance can be Euclidean, "cityblock" (sum of absolute values of coordinate differences for two pixels), "chessboard" (maximum of the absolute differences for x and y coordinates of two pixels), etc. For illustrative purposed we used "cityblock" distance in step 314. In step 315 we estimate closeness(r) of the rotated images's shape to C as a ratio 1/(1+q/t), where q is the sum of squares of pixel-wise difference for dE and dC, and t is the sum of squares of pixel-wise sum for dE and dC. It is obvious that the ratio is 1 when dE and dC are identical. Therefore, we compare closeness(r) with closeness(M,C) in step 316, and let the higher value to be the updated value of closeness(M,C) in step 317. In step 318, we check the rotation angle to see if we completed full circle, if not, we repeat the procedure from 312, otherwise we return the highest closeness estimate closeness(M,C) in step 319.

Figure 8:
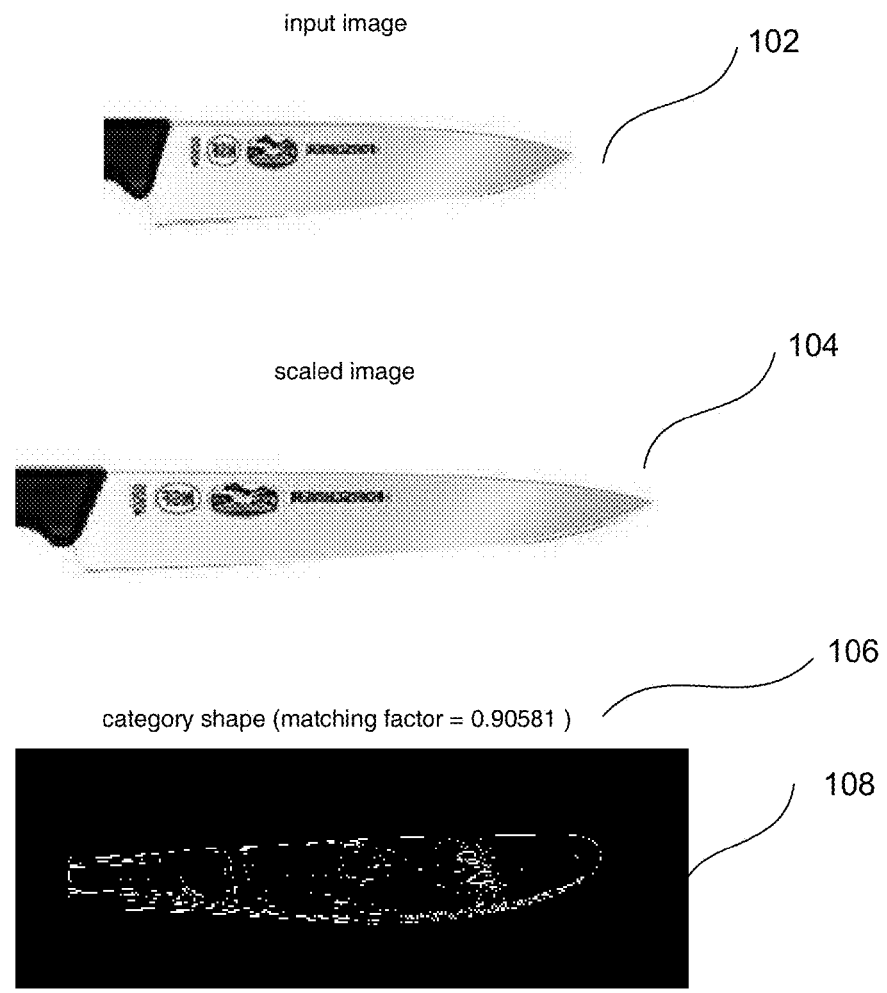
FIG. 8A-8B are examples illustrating steps in matching a knife from FIG. 6E with one of two shapes in accordance with a matching method described in FIG. 3C.
Figure 8:
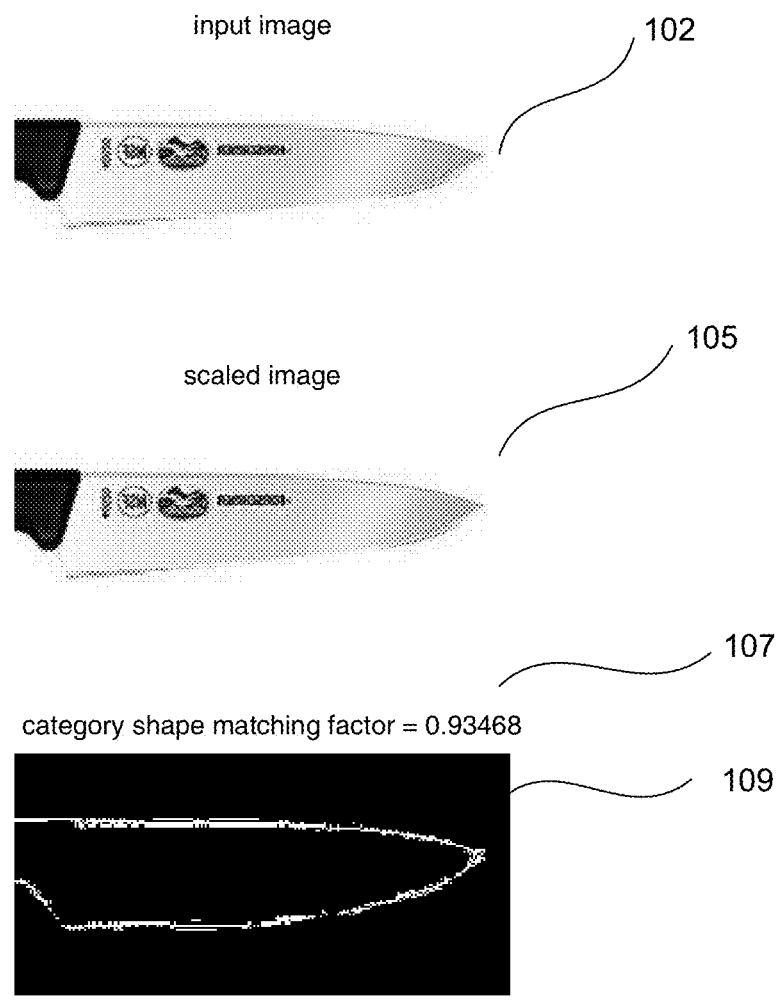

It should be noted that the above procedure can be repeated to a mirror image of M, to ensure we maximize our chances of finding true match to M's shape. Moreover, value of rotation angle steps can be tuned in to find acceptable performance of the algorithm. Many of these steps would unnecessary and the matching procedure would be very fast if all the images are taken in consistent manner. Results of matching shape of an image to a contour are illustrated in FIG. 8A. Category shape represented by contour 108 is being compared with the edge of image 102. Resized (scaled) image 104 is used for obtaining a distance transform and computing corresponding matching factor (see item 106). In this case matching factor is 0.90. Figures FIG. 8B illustrate similar analysis for another shape 109 closer resembling image 102. In this case the original image 102 is re-scaled to image 105, and the resulting matching factor is 0.93. The system therefore will conclude that based on image contour analysis image 102 is closer to a category represented by image 109 than to category represented by image 108.

Step-35: If matching of depicted user input to one of the category images fails, the system will present the user with an option to select one of the available categories for the given attribute (level of the tree). For example, the system will show shapes shown in FIG. 6A-6D, and ask the user to select one closely matching the product he is looking for.

Figure 7A:
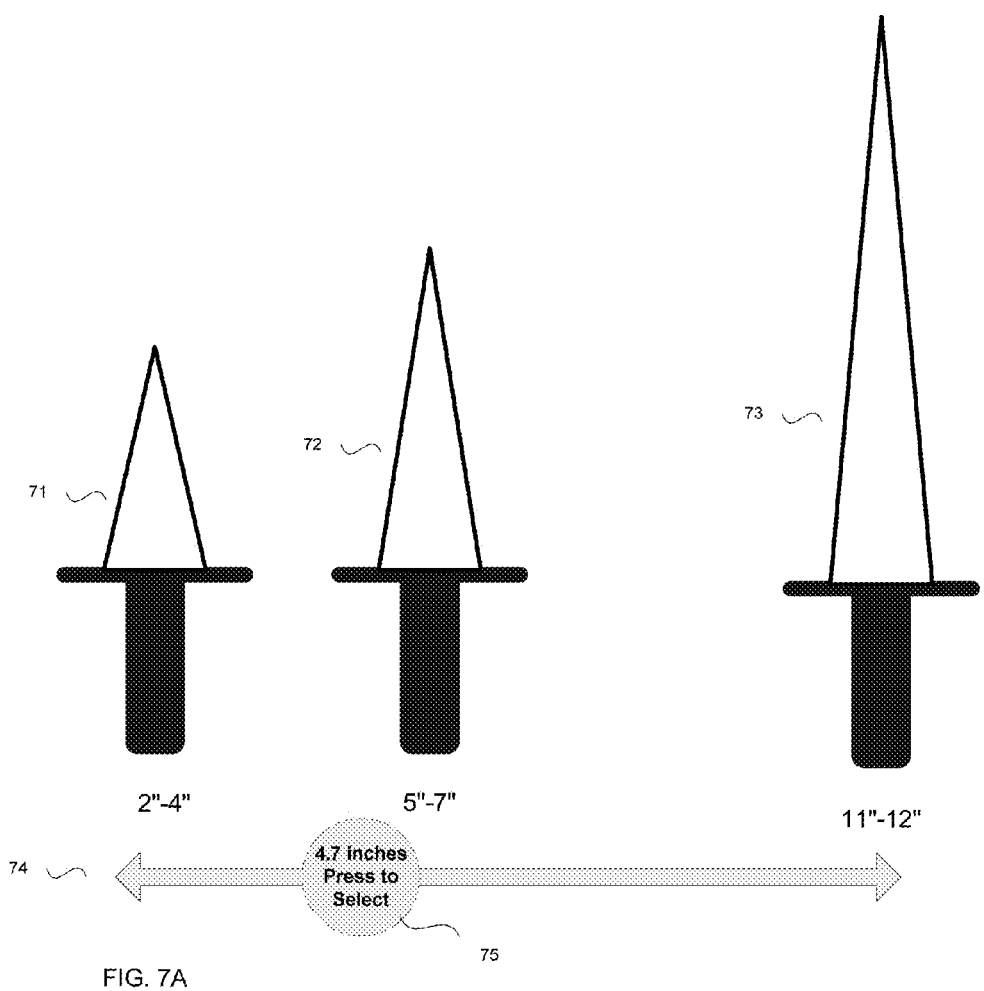
FIG. 7A-7B blade length selection graphical interface.

Steps 36-37: Now assume the system has determined that the shape of the knife the user wants is matching FIG. 6C, and the user has not specified length of the blade. In that case the system select the branch of the tree under selected shape option shown in FIG. 6C and expand the tree below that node. Thus the system will present the user with available blade length choices. (Here we assume that blade length is one of the attributes describing knifes. This particular attribute example is used for illustrative purposes only. It can easily extended to any other numerical attribute.) By default the original tree must have k or less length categories. Assume that originally the length attribute was grouped into k=4 categories, but after the selection of shape-C (FIG. 6C) it was determined that knifes of particular shape are available only in three length-categories shown in FIG. 7A: 2"-4" length category depicted by icon 71, 5"-7" category shown as icon 72, and 11"-12" category shown by icon 73. The user can select one of these three categories by pressing in any of the category icons, or he can use the sliding bar 74 and select the exact length by touching the button 75 and sliding it along the sliding bar 74 until the desired length value appears inside the button 75. Then the user can select the knife with specified blade length by pressing the button 75. According to one embodiment these functions will be performed by the user using touch screen interface available through touch screen display 1131 and touch screen sensor and controller 1133 shown in FIG. 2. Alternatively, system can provide conventional graphical user interface where the user can slide and press button 75 using a pointing device 1152 such as mouse or touchpad device.

Figure 7B:
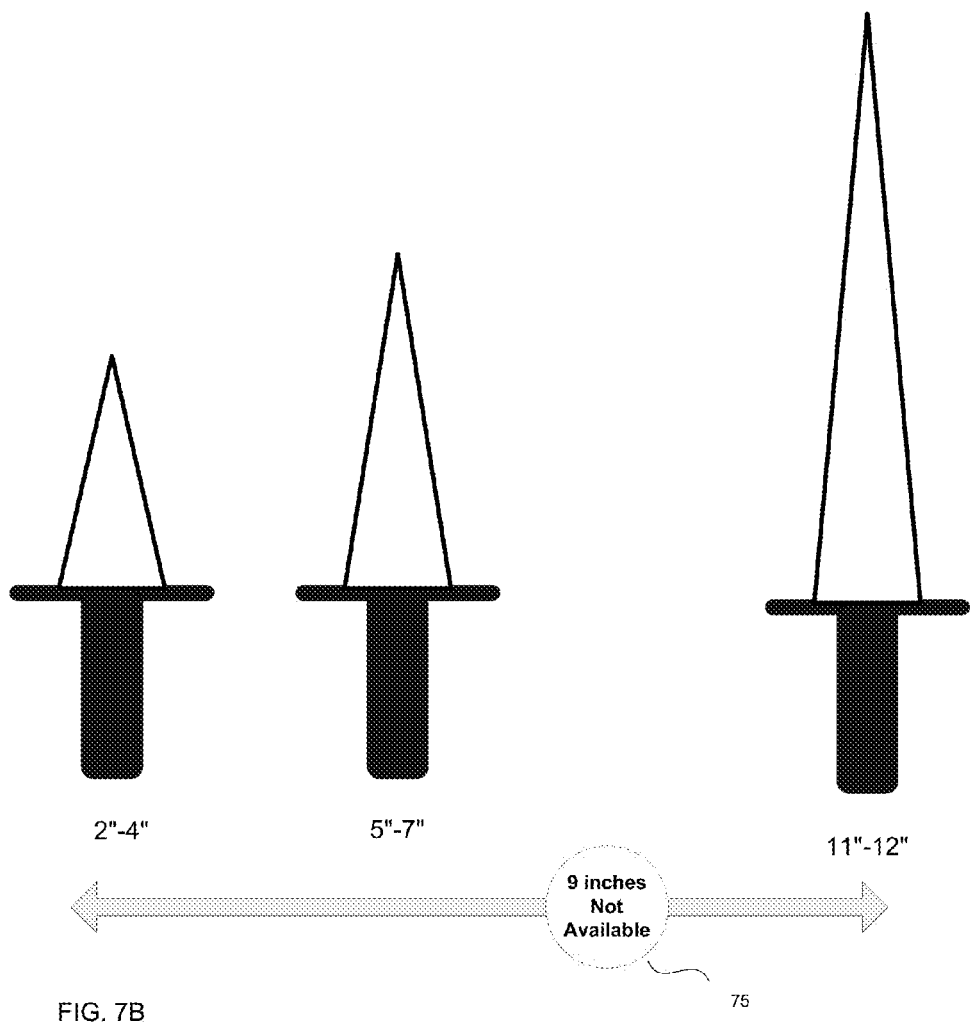

In one embodiment whenever a certain option is available the color of the sliding button 75 will be green. In cases when certain length options are not available, the color of the button will be clear or red, and/or the appropriate message will be displayed inside the button 75. For example in FIG. 7B, the unavailability of a knife of length 9" is shown. In another embodiment proper matching or availability of certain options will be communicated to the user via audio announcements. For example, the system may announce "You may select 3 blade length options". Or alternatively, the system may say "selected blade shape of length 9" is not available" if the user tries to select such option, etc. Implementation of audio announcement can be done, for example, as follows. Assume the current tree level corresponds to Category="blade length". The system knows the size of each of the category nodes at each level. Therefore the software which runs on the main processor 112 (see FIG. 2) will check the size of each node in a given tree level, identify the number Z of the nodes containing at least one object. Then generate an ascii string A, for example, in C language syntax, by executing the following code A=sprintf("You may select % d % s options", Z, Category);
As the result, A="You may select 3 blade length options" is now stored in memory 118. Conversion to an audio message is implemented using a text-to-speech routine. Text-to-speech software runs on the main processor unit 112 and can be performed by one of widely available commercial or free speech synthesis solutions (see, for example, http://en.wikipedia.org/wiki/Speech_synthesis). The system can deliver audio signal to the user via the speakers 1177 connected to PC 12 and shown in FIG. 2. Text can be converted to an audio-format, e.g. MP3, and stored for later use or for delivery to the user via email, in case search job has been queued and is not happening in real time. The audio announcement can be also delivered to the user if the system can contact him via user's cell phone 142.

Steps 38-39: Similar approach can be used for any numerical attribute such as price range, warranty period, etc. In other words, the user does not have to specify all these attributes. The system will automatically guide the user through the available options, thus quickly narrowing the search space. The process will continue until the desired product is found.

Figure 5:
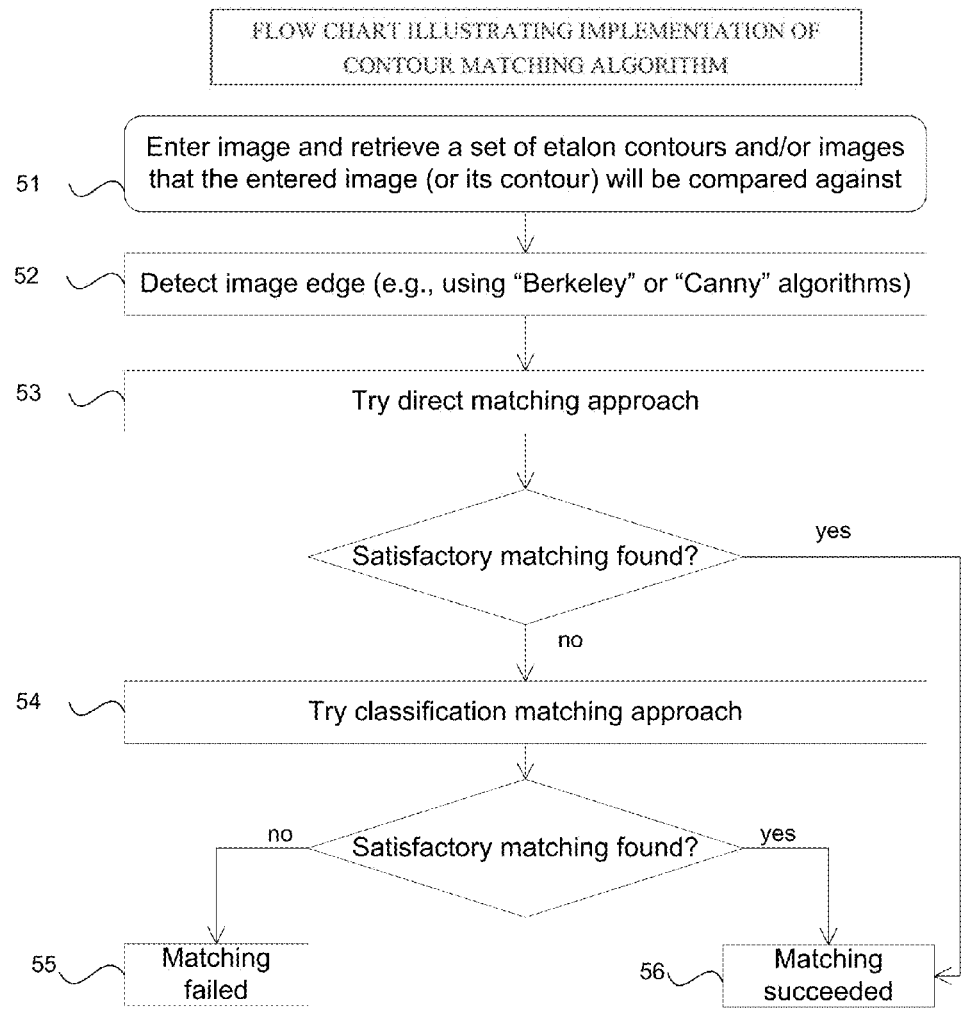
FIG. 5 is an example of a flow chart illustrating alternative contour matching method in accordance with an embodiment of the present invention.

The purpose of the algorithm is to identify input images as belonging to one of the given classes. Each class is represented by a typical object contour. The algorithm can be implemented according to the flow chart shown in FIG. 5. There are four main steps in the algorithm. Step-51: In this step the system takes user input of an image that has to be matched to and classified based on some etalon images. In the context of present invention it could be graphical depiction of user input such as contour of the object the user is searching for, a digital photograph of an object itself or another object resembling it, etc. The etalon images are category images described earlier. For each of the etalon images the system has a well defined and high quality contour available for later contour matching step.

Step-52: An edge detector method must be chosen and applied to query images. Edge detection methods include but are not limited to the methods based on the following two algorithms. One example of specific edge detection algorithm is "Berkley" edge detector, which yields almost natural edge representation of the image. Another example is the classical and faster "Canny" edge detector algorithm. In one embodiment the system will have a configuration option for selecting edge detection method depending on the previous results and timing of the search process. In another embodiment, the system will try first one method after another until satisfactory matching with available contours is found. In another embodiment, the system could try all method and use there cumulative matching results to make final matching decision.

Step-53: In this step the system attempts to do direct matching of the contour of the input image with contours of the category images. This option works well if the input image is not very complex. If match not found the matching process ends, if not the system will attempt to do a more sophisticated matching based on classification of contour elements called categorization. Particular realization of categorization depends on the quality of category shapes and/or on the characteristics of depictions of based user's input (e.g., contour of the product, etc.). The direct matching approach is based on construction of Contour Segment Network (CSN) for query images and etalon shapes. Etalon shapes should be previously normalized in some way, as they should correspond to edge detector output. The construction of the network includes two stages: 1) edge fragments linking and the extraction of almost straight segments from the linkage result; 2) connecting segments into the network. The linkage rules for these two stages are quite different. CSN are constructed for each etalon shape and for query image. The direct matching between query and etalon CSN takes into account the global network shape and also the single segment scale and orientation.

Step-54: If the direct matching fails, the contour classification approach should be chosen. In that case additional etalon images may have to be provided to train the system, and before it works well, some manual intervention may be needed. However, once the system is trained, the search process will work well. The classification approach should be used if the quality provided by the direct matching is not sufficient. In this case some number of images should be categorized manually and used as an additional etalon images. The main idea of the approach is to construct Pair of Adjacent Segments (PAS) features to describe pairs of adjacent contour segments. The segment extraction stage is similar to one used in the CSN approach. PAS features encode the location, scale and the orientation of segment pair. To train the classifier on PAS features the bag-of-features paradigm can be used. The idea of this approach is to find two contours with the sufficient number of similar features.

We claim:

1. A method of performing a user initiated search query, the method comprising:
    receiving, via a receiver, user input comprising description details of at least one desired object;
    retrieving a plurality of objects from a database sharing one or more of the description details of the user input;
    retrieving an image of the at least one desired object based on one or more of the plurality of objects;
    identifying at least one contour image stored in the database as a category relevant to the image;
    comparing the at least one contour image to an edge of the image to identify a matching factor between the at least one contour image and a corresponding contour of the image;
    displaying, via the processor, all available contours of all images that match the corresponding contour of the image;
    receiving, via the receiver, a selection of one of the available contours from the user; and
    performing the search query based on the user selected contour.

2. The method of claim 1, further comprising:
    constructing a tree data structure based on the description details of the plurality of objects, the tree data structure comprising one or more attributes related to each of the plurality of objects retrieved.

3. The method of claim 2, further comprising:
if no image is available of the at least one desired object, displaying categories of at least one value attribute of a level of the tree data structure that does not include images;
determining whether additional levels of the tree data structure are available that the user has not yet viewed; and
if so, displaying additional categories of the at least one value attribute of another level of the tree data structure that does not include images.

4. The method of claim 1, wherein the user initiated search query is performed via a user interface.

5. The method of claim 4, wherein the user input is a description of a desired product.

6. The method of claim 5, wherein the categories of the at least one value attribute and the additional categories of the at least one value attribute include at least one numeric predefined attribute value comprising at least one of a product price range, product warranty period, product length, and product weight.

7. The method of claim 1, wherein the user input is at least one of text, audio and a digital image.

8. An apparatus configured to performing a user initiated search query, the apparatus comprising:
a receiver configured to receive user input comprising description details of at least one desired object; and
a processor configured to
retrieve a plurality of objects from a database sharing one or more of the description details of the user input,
retrieve an image of the at least one desired object based on one or more of the plurality of objects,
identify at least one contour image stored in the database as a category relevant to the image;
comparing the at least one contour image to an edge of the image to identify a matching factor between the at least one contour image and a corresponding contour of the image;
display all of available contours of all images that match the corresponding contour of the image,
receive and process a selection of one of the available contours from the user, and
perform the search query based on the user selected contour.

9. The apparatus of claim 8, wherein the processor is further configured to construct a tree data structure based on the description details of the plurality of objects, the tree data structure comprising one or more attributes related to each of the plurality of objects retrieved.

10. The apparatus of claim 9, wherein if no image is available of the at least one desired object, the processor is configured to display categories of at least one value attribute of a level of the tree data structure that does not include images, and determine whether additional levels of the tree data structure are available that the user has not yet viewed, and if so, to display additional categories of the at least one value attribute of another level of the tree data structure that does not include images.

11. The apparatus of claim 10, wherein the categories of the at least one value attribute and the additional categories of the at least one value attribute include at least one numeric predefined attribute value comprising at least one of a product price range, product warranty period, product length, and product weight.

12. The apparatus of claim 8, wherein the user initiated search query is performed via a user interface.

13. The apparatus of claim 8, wherein the user input is at least one of text, audio and a digital image.

14. The apparatus of claim 13, wherein the user input is a description of a desired product.

15. A non-transitory computer readable storage medium configured to store instructions that when executed cause a processor to perform a user initiated search query, the processor being further configured to perform:
receiving user input comprising description details of at least one desired object;
retrieving a plurality of objects from a database sharing one or more of the description details of the user input;
identifying at least one contour image stored in the database as a category relevant to the image;
comparing the at least one contour image to an edge of the image to identify a matching factor between the at least one contour image and a corresponding contour of the image;
displaying, via the processor, all available contours of all images that match the corresponding contour of the image;
receiving a selection of one of the available contours from the user; and
performing the search query based on the user selected contour.

16. The non-transitory computer readable storage medium of claim 15, wherein the processor is further configured to perform:
constructing a tree data structure based on the description details of the plurality of objects, the tree data structure comprising one or more attributes related to each of the plurality of objects retrieved.

17. The non-transitory computer readable storage medium of claim 16, wherein the processor is further configured to perform:
if no image is available of the at least one desired object, displaying categories of at least one value attribute of a level of the tree data structure that does not include images;
determining whether additional levels of the tree data structure are available that the user has not yet viewed; and
if so, displaying additional categories of the at least one value attribute of another level of the tree data structure that does not include images.

18. The non-transitory computer readable storage medium of claim 15, wherein the user initiated search query is performed via a user interface.

19. The non-transitory computer readable storage medium of claim 15, wherein the user input is at least one of text, audio and a digital image.

20. The non-transitory computer readable storage medium of claim 19, wherein the user input is a description of a desired product.

* * * * *